United States Patent Office 2,794,022
Patented May 28, 1957

2,794,022
PRODUCTION OF CYCLOSERINE

Wallace F. Runge, Terre Haute, Ind., assignor to Commercial Solvents Corporation, Terre Haute, Ind., a corporation of Maryland No Drawing. Application March 25, 1955,
Serial No. 496,940

5 Claims. (Cl. 260—307)

My invention relates to the antibiotic agent cycloserine and more particularly, it relates to a synthetic process for production of cycloserine.

Cycloserine is the generic name given to an antibiotic active against tuberculosis in human beings. The identity of the antibiotic chemically is 4-amino-3-isoxazolidinone, the structure of which is:

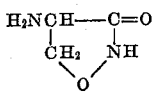

The antibiotic is more fully described in application Serial No. 424,612 by Roger L. Harned and Eleanore K. La Baw along with a method for producing it by a fermentation process which involves culture of the organism *Streptomyces orchidaceus* on an aqueous nutrient medium.

I have now discovered a synthetic process for production of the antibiotic cycloserine. My new process is conveniently carried out and results in good yields of the desired antibiotic.

My new process consists essentially of the production of cycloserine from acetyl cycloserine. The chemical identity of acetylcycloserine is 4-acetamido-3-isoxazolidinone, the structure of which is:

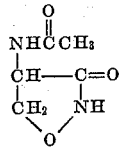

The starting material, acetylcycloserine, is more fully described in my co-pending application Serial No. 495,749 filed March 21, 1955. The compound acetylcycloserine can be produced by reaction of hydroxylamine and methyl acetamidoacrylate in the presence of a base. The reaction is carried out using an excess of the basic catalyst, i. e. amounts in excess of the usual catalytic amounts and also an excess of hydroxylamine, an inert solvent for the reaction being also used. Upon completion of the reaction of hydroxylamine and methyl acetamidoacrylate, the reaction mixture is acidified to convert the product to the free form, it being obtained in the reaction mixture in the salt form due to the presence of the basic catalyst.

My new process for production of cycloserine from acetylcycloserine consists essentially of the alkaline hydrolysis of acetylcycloserine to obtain the desired cycloserine. The base employed to effect the alkaline hydrolysis of acetylcycloserine can be an alkali metal hydroxide such as, for example, sodium hydroxide, potassium hydroxide, etc.; alkaline earth metal hydroxide such as, for example, calcium hydroxide, barium hydroxide, etc. In carrying out my new process, I add the acetyl cycloserine to an aqueous solution of the base and allow the hydrolysis to proceed. My new process can be carried out at room temperature in which case several days are required to obtain conversion of the acetyl cycloserine to cycloserine or the process can be carried out at elevated temperatures in which case the reaction time is correspondingly shortened. In employing elevated temperatures, it is advisable to avoid temperatures high enough to decompose the desired cycloserine product. For this reason, I prefer not to employ temperatures in excess of those at which the reaction mixture can be refluxed, since I have found that when the reaction mixture is refluxed for a period of several hours, there is an initial increase in the amount of cycloserine present as the acetylcycloserine is converted to the desired product, and then as refluxing continues, there is a gradual decrease in the amount of cycloserine present as decomposition of the antibiotic takes place.

Upon completion of the reaction, cycloserine can be recovered from the reaction mixture by any convenient means. I prefer to precipitate the cycloserine as the silver salt by adding silver nitrate to the reaction mixture, and removing precipitated silver salt of cycloserine. The silver salt of cycloserine can then be decomposed to obtain cycloserine by slurrying the silver salt in water, adding hydrochloric acid to the slurry, and removing precipitated silver chloride from the cycloserine solution. The solution can then be freeze dried under vacuum to obtain a dry, amorphous cycloserine product which can be redissolved in water and crystallized by addition of acetone to the solution.

The following examples are offered to illustrate my invention; however, I do not intend to be limited to the specific materials, proportions, or procedures set forth. Rather I intend to include within the scope of this invention all equivalents obvious to those skilled in the art.

Example I

A 1-gram portion of acetylcycloserine was dissolved in 100 ml. of 2 N sodium hydroxide. The solution was then refluxed for three hours. A 53 percent conversion of acetylcycloserine to cycloserine was obtained.

Example II

A 20 mg. portion of acetylcycloserine was dissolved in 10 ml. of one N sodium hydroxide. The solution was maintained at room temperature for 11 days. A 67 percent conversion of acetylcycloserine to cycloserine was obtained.

Example III

A solution containing 10 mgs. of acetylcycloserine per ml. of 1.7 N potassium hydroxide was heated at a temperature of 55–60° C. for a period of 10 hours. A 78% conversion of acetylcycloserine to cycloserine was obtained.

Example IV

The process of Example III was repeated using calcium hydroxide in place of potassium hydroxide. The acetylcycloserine was converted to cycloserine.

Now having described my invention, what I claim is:

1. A process for the production of 4-amino-3-isoxazolidinone which comprises reacting 4-acetamido-3-isoxazolidinone with an aqueous solution of a compound selected from the group consisting of alkali metal hydroxide and alkaline earth metal hydroxide at a temperature not in excess of the boiling point of the reaction mixture to obtain 4-amino-3-isoxazolidinone.

2. A process for the production of 4-amino-3-isoxazolidinone which comprises reacting 4-acetamido-3-isoxazolidinone with an aqueous solution of a compound selected from the group consisting of alkali metal hydroxide and alkaline earth metal hydroxide at a temperature not in excess of the boiling point of the reaction mixture and recovering 4-amino-3-isoxazolidinone from the reaction mixture.

3. A process for the production of 4-amino-3-isoxazolidinone which comprises reacting 4-acetamido-3-isoxazolidinone with an aqueous solution of sodium hydroxide at a temperature not in excess of the boiling point of the reaction mixture and recovering 4-amino-3-isoxazolidinone from the reaction mixture.

4. A process for the production of 4-amino-3-isoxazolidinone which comprises reacting 4-acetamido-3-isoxazolidinone with an aqueous solution of potassium hydroxide at a temperature not in excess of the boiling point of the reaction mixture and recovering 4-amino-3-isoxazolidinone from the reaction mixture.

5. A process for the production of 4-amino-3-isoxazolidinone which comprises reacting 4-acetamido-3-isoxazolidinone with an aqueous solution of calcium hydroxide at a temperature not in excess of the boiling point of the reaction mixture and recovering 4-amino-3-isoxazolidinone from the reaction mixture.

References Cited in the file of this patent

FOREIGN PATENTS 715,362     Great Britain _____ Mar. 15, 1954

OTHER REFERENCES

Karrer: "Organic Chemistry" (Elsevier, 2nd Eng. ed.), p. 211, 452 (1946).